Patented July 2, 1929.

1,719,463

UNITED STATES PATENT OFFICE.

WILLIAM HOWARD COLE, OF PARIS, FRANCE.

PROOFING METAL, ESPECIALLY IRON AND STEEL, AGAINST RUST.

No Drawing. Application filed February 28, 1927, Serial No. 171,730, and in Great Britain January 1, 1927.

This invention has for its object the production of a certain, simple, inexpensive process by which metals, especially manufactured pieces of metal, especially iron and steel pieces, may be treated, so that they may be almost permanently made proof against rust or corrosion, through exposure to the elements, and most of the corrosive fumes to which they may be exposed.

I am aware that many attempts have been made to rust-proof permanently pieces of steel and iron by submitting them to a bath of certain materials for a certain length of time, thus causing a precipitant of inhibition elements to lodge on the surfaces of pieces of metal being treated, and in several cases, caused an inhibition against rust for a limited time, but so far as I know none of these efforts has produced protected articles which will stand such tests as the standard hot salt spray test adopted by the United States of America Bureau of Standards, calling for over thirty hours test as an acceptable minimum.

Neither has it been found certain that in all cases was there a uniform coating or action over every exposed part of the pieces, and neither has any solution and immersion system been formulated capable of withstanding this test after exposure of, say 1000° F., and other minor tests called for in commerce.

The process and formula, according to the present invention, fulfils all the above conditions and achieves results not yet produced in any other systems. I have found a process for obtaining a combination of metals, by a wet or liquid process, which said combination gives a combination of metals according to the wishes of the manufacturer, making it highly rust-resisting on every portion of the surface, whether inner or outer portions. At the same time, the articles treated are capable of being highly polished, without disturbing the shape or the quality of the piece, such as, for instance, its temper or other condition.

In order to illustrate the nature of my invention, I describe the production and use of a solution, which I call No. 27, with which excellent results have been obtained, but I do not limit myself to this example, as any other proportion can be used.

I use four metals all of which are reduced to a fine powder before solution, as this conduces to subsequent ease and speed of manipulation. The four metals entering into this formula are: aluminium, zinc, iron and chromium.

1. Aluminium is generally used in the form of a fine powder, because it is more easily and rapidly dissolved.

This is dissolved in phosphoric acid of a strength of 45° Bé. and water containing little or no lime.

This solution must be made to a point of saturation.

I find the best mixture of phosphoric acid and water to be—

|  | Parts by volume. |
|---|---|
| Water | 4 |
| Acid (45° Bé.) | 1 |

There must be a complete degree of saturation, or until there is a quantity of this undissolved metal remaining, after no bubbles of gas appear when the solution is stirred up.

2. Zinc is used in the form of a fine powder, dissolved in a mixture of phosphoric acid and water:

|  | Parts by volume. |
|---|---|
| Water | 4 |
| Acid, 45° Bé | 1 |

The liquid must be placed in the container vessel first and the zinc powder slowly sprinkled into it.

The water must not contain any lime.

The metal solution must be to saturation as in the case of aluminium.

3. Iron. This may be in a moderately fine state, clean and small is preferable.

Produce a saturated solution as for the first two metals.

This solution of the metal produces a considerable quantity of gas, rather disagreeable, and therefore the operation should be made in a well-ventilated room.

Considerable care should be given that the state of saturation is produced, or the subsequent operation will not be perfect, and if not noted carefully, it might be difficult to trace the cause.

The same ratio of phosphoric acid and pure water must be used. Steel can be used instead of iron and appears to give better results.

4. Chromium. This must be used as fine as it can be procured. Chromium oxide has been the easiest to adopt and the solution made as below gives a satisfactory result:

Chromium oxide is dissolved to saturation in a mixture as follows:

|  | Parts. |
|---|---|
| Phosphoric chloride | 1 |
| Sodium phosphate (dissolved to saturation in pure water) | 2.5 |
| Phosphoric acid, 45° Bé | 3 |
| Pure water | 8 |

The quantity of acid water used should produce a saturated solution. If all is not dissolved, add more acid water gradually until a saturated solution is complete in every case.

*Stock or mother liquor.*

This is the combination of the solutions of the metals from which solid salts may be obtained by evaporation. In some cases the process may be effected directly with this mother liquor.

The mother liquor is made as follows, the parts being by volume:

|  | Parts. |
|---|---|
| (1) Al liquid | 1 |
| (2) Zn liquid | 5 |
| (3) Fe liquid | 7 |
| (4) Chromium liquid | ¾ |

After well mixing, add water to bring the strength down to 26° Bé.

For transportation and ease in handling, the mother liquor is concentrated by evaporation or vacuum drying, to a salt or mixture of salts containing the whole contents in the correct proportions, ready to be dissolved in water, and the iron or steel or other metals treated with such a solution as described may, after treatment, be confidently employed without fear of rust or corrosion in the future.

*Accelerating composition.*

This accelerating composition has the property of hastening the chemical action between the surface of the iron or steel pieces being treated, and the operating liquid.

The accelerating composition is preferably made up as follows, and is added to the mother liquor, when first made, either for direct use or for evaporation down to salts. This accelerating composition consists of a mixture of equal parts of the following aqueous saturated solutions: ammonium phosphate, sodium biborate and potassium bichromate. This mixture may be added to the mother liquor or to the salt produced from it immediately before direct use for treating metals, or it may be added to the mother liquor before being concentrated to salts or used directly for treating metals. 10 c. c. of this accelerating composition to each litre of mother liquor is a suitable quantity.

Every one of the metals mentioned, may be used separately with fairly satisfactory results, but by taking even one metal away from the group of metals, the value I ascribe to the No. 27 combination is depreciated; for this treatment, as formulated, produces a combination of metals that I believe to be closer to being neutral electrically to iron than any single metal or combination of metals, and in my view, for this reason has a greatly increased value as a rust-preventer over any one metal.

The mother liquor remaining after treatment is replenished by the addition of further mother liquor or its equivalent in dissolved salts, as indicated by the reading of a hydrometer, and is used again. This can be repeated several times, when the liquor may be thrown away. This spent liquor, which contains traces of iron besides the aluminium, zinc and chromium, can be stored and kept cool, and then used again, and with its aid, a deposit containing all these metals, including iron, can also be obtained on the iron or steel articles. Such a liquor as this spent mother liquor cannot apparently be readily obtained by mixing solutions of aluminium, zinc, iron and chromium. The long boiling of solution No. 27, during treatment of the iron or steel articles, and the subsequent cooling and settling of the spent liquor appears to have some effect on the formation of this second solution, with very useful results.

It will be understood that treated pieces in every case can be finished in a variety of ways. Thus, in the case of articles treated with the solution and process No. 27, if it is desired to leave a soft black velvety permanent finish, this may be obtained, for instance, by hand rubbing a very thin coating of raw linseed oil over the treated pieces. If a quantity of pieces is required, a tumbling barrel can be used, partially filled with pieces of cloth saturated with raw linseed oil, mixed with a quantity of turpentine: but the pieces generally give a satisfactory appearance after simply washing and brushing them, or simply drying them.

What I claim and desire to secure by Letters Patent is:—

1. A proofing composition for metals, containing aluminium, zinc, iron and chromium, consisting in a mixture of saturated solution of these four metals in phosphoric acid and water.

2. A proofing composition for metals, containing aluminium, zinc, iron and chromium, consisting in a mixture of saturated solution of these four metals in phosphoric acid and water to which an accelerating composition has been added, said accelerating composition consisting of equal parts of saturated aqueous solutions of ammonium phosphate, sodium biborate and potassium bichromate.

3. A proofing composition as claimed in claim 1, in which the saturated solutions of the metals are in the following proportions by volume: aluminium, 1 part; zinc, 5 parts; iron, 7 parts; chromium, ¾ part.

4. A rust-proofing composition for metals comprising a mother liquor consisting of a mixture of the saturated solutions of aluminum, zinc, iron and chromium in the following proportions: aluminum, 1 part; zinc, 5 parts; iron, 7 parts; dissolved separately to saturation in one part of phosphoric acid 45° Bé. and four parts of water, and chromium ¾ part dissolved to saturation in three parts of phosphoric acid 45° Bé., eight parts of water, two and one half parts of a saturated aqueous solution of sodium phosphate and one part phosphoric chloride, to which said mother liquor is added, an accelerating composition consisting of a mixture of equal parts of the saturated aqueous solutions of ammonium phosphate, sodium biborate and potassium bichromate, in the proportion of 1% in volume of the amount of the mother liquor.

5. A process for the proofing of ferrous metals against rust by depositing on said ferrous metals the mixed phosphates of aluminum, zinc, iron and chromium, by treating the metals with a solution of aluminum, zinc, iron and chromium in a solution of water and phosphoric acid.

In testimony whereof, I affix my signature.

WILLIAM HOWARD COLE.